June 30, 1970　　　J. R. JONES　　　3,517,996

MICROFILMING SYSTEM

Filed Dec. 26, 1967　　　3 Sheets-Sheet 1

INVENTOR
JOSEPH R. JONES

BY Charles B Curry
ATTORNEY

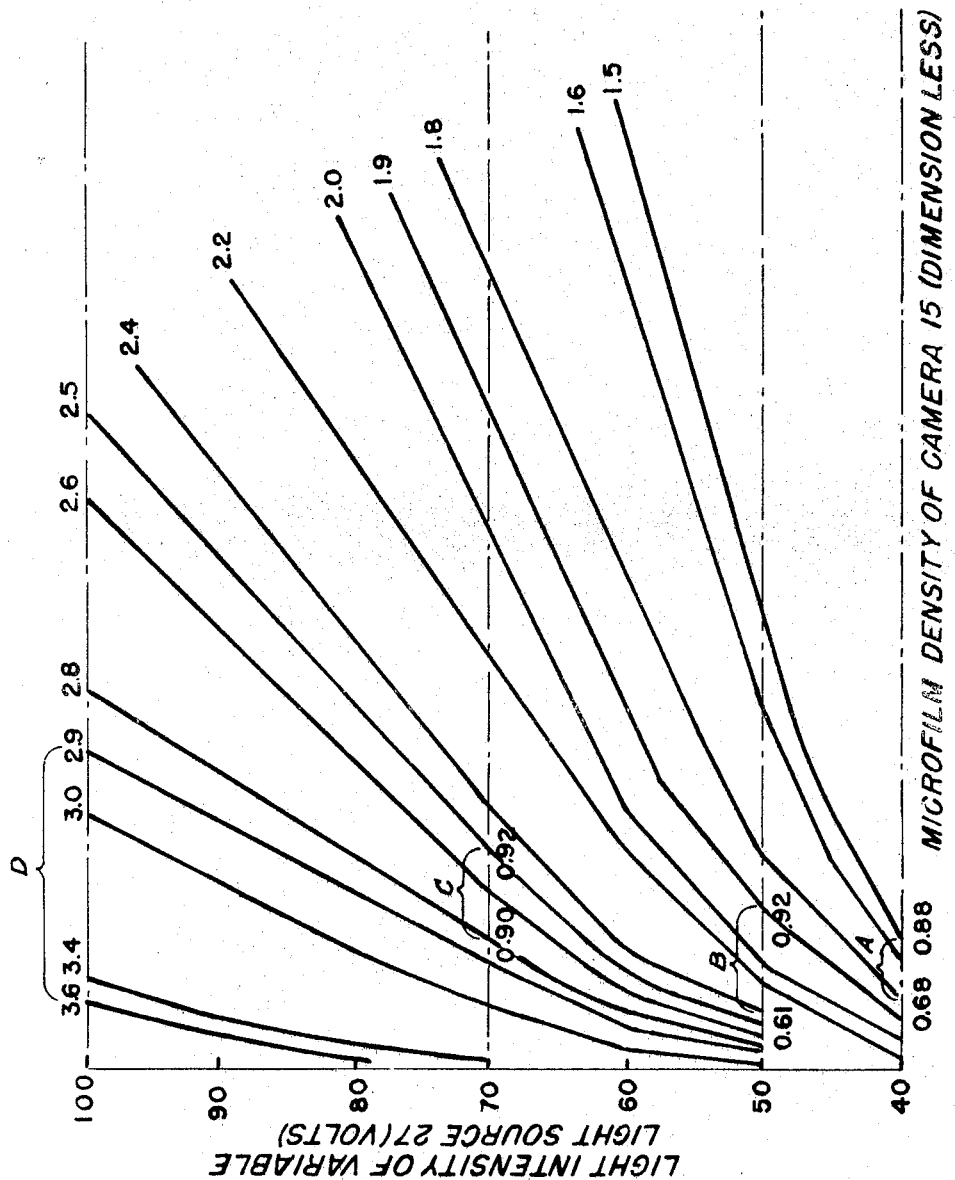

United States Patent Office 3,517,996
Patented June 30, 1970

3,517,996
MICROFILMING SYSTEM
Joseph R. Jones, Concord Mobile Home, Galloway Drive,
Space 5, Concord, Calif. 94520
Filed Dec. 26, 1967, Ser. No. 693,394
Int. Cl. G03b 27/76
U.S. Cl. 355—69          2 Claims

ABSTRACT OF THE DISCLOSURE

A technique for converting radiographic film having a predetermined density range to microfilm having a predetermined density range comprising the transmitting of light from a constant output light source through the radiographic film and using a photodetector to detect the amount of transmitted light. The detected light output is then used to control the light output of a variable light source. The controlled light output from the variable light source is determined by that light required to be passed through the radiographic film to the microfilm so that the microfilm will be within the predetermined density range. After the light output of the variable light source is determined then that controlled amount of light is passed through the radiographic film and onto the microfilm.

---

The invention described herein may be manufactured and used by or for the Government of the United States of America for governmental purposes without payment of any royalties thereon or therefor.

The present invention relates to microfilming and more particularly to the conversion of information contained on radiographs to microfilm.

One of the primary methods of quality control is the use of X-rays to photograph equipment being examined. The films which have been exposed to the X-rays have been generally referred to as radiographs. Radiographs are typically contained on 14 by 17 inch films and eight of such films weigh approximately one pound. Millions of such radiographic films are stored for future reference, frequently for several years, and it therefore requires considerable storage volume for such retention. In addition the amount of silver contained in these films is very substantial. For example, five pounds of silver can be obtained by any of several conventional recovery processes, from about 100 pounds of radiographic film. By use of the microfilming technique of the present invention all of the silver may be recovered and a volume of 7 feet by 7 feet by 21 feet of radiographic storage can be reduced to an equivalent total volume of about 15 inches by 25 inches by 8 inches in microfilm storage.

Many different attempts have been made to reduce radiographic films to microfilm. However, considerable difficulty has been encountered because radiographic films have variable film densities of from about 1.5 to about 3.5 (dimensionless units) and the conversion of this into meaningful microfilm information has been extremely difficult and has not been heretofore achieved. This is in part due to the fact that to have meaningful information contained on microfilm, which is responsive to ordinary light, there is the requirement that the microfilm have a density of from about 0.6 to about 0.9 (dimensionless units).

Radiographic film densities may be also considered in terms of percentage of light transmission. Such densities or percentage of light transmission are generally determined by a device commonly known as a densitometer. A density of about 1.5 results in the transmission of about 30 percent of the light and a density of about 3.5 results in transmission of about 2 percent of the light. These radiographic films are responsive to X-ray or to gamma ray radiation and it is necessary to stay within the range of 1.5 to about 3.5 density in order to obtain adequate detail and resolution of the subject being examined. Optimum density for purposes of resolution is from 2.5 to 3.0; however, adequate detail will be achieved from 1.5 to 3.5. The lower density of 1.5 is occasionally employed if many subjects are required to be examined over a relatively short period of time where it is necessary to reduce the overall exposure time of each of the examined subjects. In addition, the geometry of the subject may result in varying densities on the radiograph and therefore a single film may have a density range of 1.5 to 3.5. As distinguished from radiographic film, photographic film has optimum resolution in the density range of from about 0.6 to about 0.9. This difference in range is because photographic film is photon or light sensitive and utilizes different basic material than does radiographic film.

Briefly, the present invention comprises a technique for converting radiographic film to microfilm by passing light from a constant output light source through the radiographic film and using a photodetector to detect this light output to control the light output of a variable light source. The controlled amount of light output from the variable light source is determined by that light required to be passed through the radiographic film to the microfilm so that the microfilm will be within the proper density range. After the light output of the variable light source is determined then that controlled amount of light is passed through the radiographic film and onto the microfilm. In one embodiment of the present invention this is performed by a control device that operates a timing device and a light control device. The control device actuates the timing device which delays the moving of the radiographic film from the indicating or first position to the recording or second position. When the radiographic film is in the indicator position, the density information thereof is used by the control device to actuate the light control device to select the proper light output from a variable light source. After this has been done, then the timing device moves the radiographic film from the indicator position to the recording position. In another embodiment, a calibrated dial is used in cooperation with the voltage output of a photodetector that receives light from the radiograph when the light from a constant light source is passing through. Then, in accordance with the information on the dial, the appropriate voltage to the variable light source is selected. The radiographic film is then positioned in the light path of the variable light source and the light passing there through is then recorded on microfilm resulting in conversion of the radiographic film to microfilm having optimum density.

Other obects, advantages and novel features of the invention will become apparent from the following detailed description of the invention when considered in conjunction with the accompanying drawings wherein:

FIG. 2 is a family of curves showing the microfilm density as a function of radiographic film density and light intensity at the variable light source;

Figure 1:
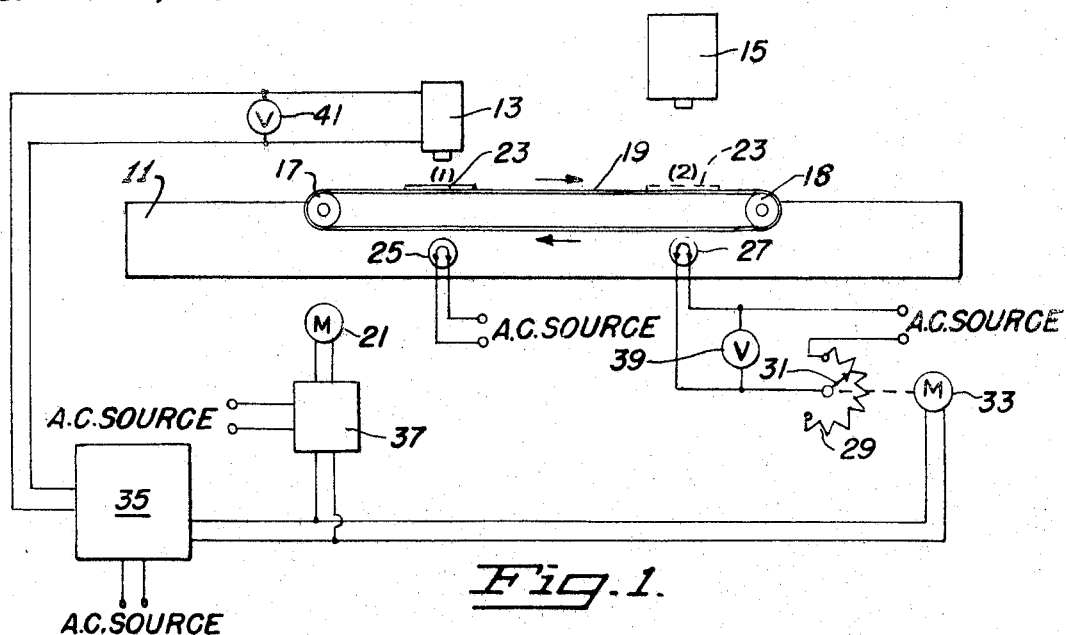
FIG. 1 is a schematic diagram of one embodiment of the microfilm system of the present invention.

In FIG. 1 is schematically illustrated the method and devices for converting radiographic information into microfilm information having optimum density. This system includes table 11, photodetector 13 and microfilm camera 15. Mounted on table 11 are rollers 17 and 18 over which is mounted transparent belt 19. Roller 17 is rotated by drive motor 21 which, when operated, causes belt 19 to move in the direction indicated. Mounted on transparent belt 19 is radiograph 23 which is illustrated in the indicating or first position by reference symbol (1), and in the recording or second position by reference symbol (2). Mounted directly below photodetector 13 and radiograph 23 in the first position (1) is constant light source 25 which is connected to an AC source as indicated. Mounted directly below camera 15 and radiographic film 23 in the second position (2) is variable light source 27 which is connected to an AC power source through variable resistor 29. The rotatable arm 31 of variable resistor 29 is selectively positioned by means of drive motor 33. The particular position of drive motor 33 will be determined by control device 35 which receives its power from an AC source as indicated. Control device 35 is responsive to the voltage output of photodetector 13. The particular position of drive motor 33 and arm 31 of variable resistor 29 is determined by the voltage output level of photodetector 13. The particular method of operation of control device 35 and drive motor 33 is not shown since there are many different techniques well known to those skilled in the art for achieving this objective. For example, control device 35 may have plurality of solenoids which are operated in response to progressively larger voltage outputs from photodetector 13. Each of these solenoids may in turn provide power to drive motor 33 which, when it reaches a predetermined position, may actuate a switch which will in turn open the particular solenoid and prevent the drive motor from rotating further. Another technique that may be employed for stopping drive motor 33 at the position determined by the photodetector voltage output may be the use of a feedback from a variable voltage output device that is operatively connected to the drive shaft of drive motor 33. This feedback is used to cancel the output of the photodetector. When the photodetector voltage becomes cancelled, then the drive motor will stop operation and arm 31 will be at the position required by the photodetector output voltage.

Timer device 37 is used to apply power to drive motor 21 and is responsive to the output signal from control device 35. The mode of operation is such that there will be a delay in time, after a signal has been transmitted to drive motor 33 from control device 35, which time will be slightly greater than the maximum time required for drive motor 33 to rotate arm 31 of variable resistor 29 to the maximum position. After this delay, timer 37 will cause power to be applied to drive motor 21 which will rotate roller 17 a predetermined distance or for a predetermined time at a predetermined rate which is determined by means of timer 37. The time or distance selected by timer 37 is such that radiograph 23 will be moved from the first position (1) to the second position (2) by transparent belt 19.

Operation of the radiograph to microfilm conversion device set forth in FIG. 1 is as follows. Radiographic film is placed on transparent belt 19 and constant output light source 25 is actuated. The light from constant light source 25 is transmitted through transparent belt 19, without attenuation, then through radiograph 23, with attenuation, and then to the light input of photodetector 13. The elecrical output of photodetector 13 is proportional to the amount of light transmitted through radiographic film 23 in the first position (1) which is proportional to the density of the radiographic film. Therefore, the electrical output from photodetector 13 is proportional to the density of the radiographic film. The electrical signal from photodetector 13 is applied to control device 35 which provides an electrical output signal to drive motor 33 for rotating it a predetermined amount. This predetermined amount of rotation is determined by the voltage output level of photodetector 13. The amount of rotation determines the amount of rotation of arm 31 of variable resistor 29 which determines the amount of resistance inserted in series with the AC voltage source applied to variable light source 27. If the degree of rotation of drive motor 33 is large, then more series resistance will be inserted and the light output from variable light source 27 will be decreased. Conversely, if the degree of rotation of drive motor 33 is small, then less resistance will be inserted in series with the AC source and variable light source 27 and the light output will be increased. The degree of rotation of drive motor 33 and the rotation of arm 31 or the light output of light source 27 will be hereinafter described in connection with the diagrams set forth in FIGS. 2, 3 and 4. After arm 31 is driven to the selected position as determined by control device 35, then timer device 37 causes belt 19 to convey the radiographic film from the first position (1) to the second position (2) which is directly in line with variable light source 27 and the lens of microfilm camera unit 15. After the radiographic film is in the second position (2) and variable light source is at the selected value (as determined by the voltage output of photodetector 13 when the radiograph was in the first position) then camera 15 is actuated by conventional means and the image transmitted thereto is recorded on the microfilm. The microfilm is preferably 35 millimeter, however, it is not limited to this as will be obvious to one skilled in the art. After the microfilm in camera 15 has been exposed then it is developed and stored. After radiographic film 23 has been removed from the second position (2), the equipment is reset and another radiographic film is positioned at the first position (1) and the process repeated. The radiographic film may be then destroyed and the silver recovered. There are many techniques which will be obvious to one skilled in the art by which the equipment can be reset such as the use of a reset switch which would reset timer device 37 and return drive motor 33 and arm 31 to the initial positions.

In FIG. 2 is illustrated a family of curves wherein the abscissa represents the microfilm density of camera 15 when viewing a radiographic film located at a position (2) of FIG. 1. The ordinent represents the light output of variable light source 27 of FIG. 1 in terms of the voltage applied thereto. The voltage output referred to in FIG. 2 would be that voltage indicated by voltmeter 39 of FIG. 1. In addition, each of the curves set forth in the family of curves of FIG. 2 has identification that denotes the density of a particular radiographic film. The illustrated density range of these radiographs is from 1.5 to 3.6 which represents a typical range of radiographic film densities. Densities above and below this range are generally not used as the film is then either too dark or too light for adequate viewing. It should be noted that the abscissa is not a single set of numbers, but rather, it has a plurality of sets of numbers where each set corresponds to a particular voltage for each of the different film densities. For example, in FIG. 2 (as well as in FIGS. 3 and 4) are illustrated density ranges A, B, C, and D which correspond to voltages of 40, 50, 70 and 100, respectively. For example, a radiographic film having a density of 2.5 with light source 27 operated at 70 volts would result in a microfilm intermediate density (I/D, see FIG. 4) of 0.92. These curves were developed by utilizing variable light source voltage range of from 50 volts to 100 volts and radiographic film density range of from 1.5 to 3.6.

Figure 3:
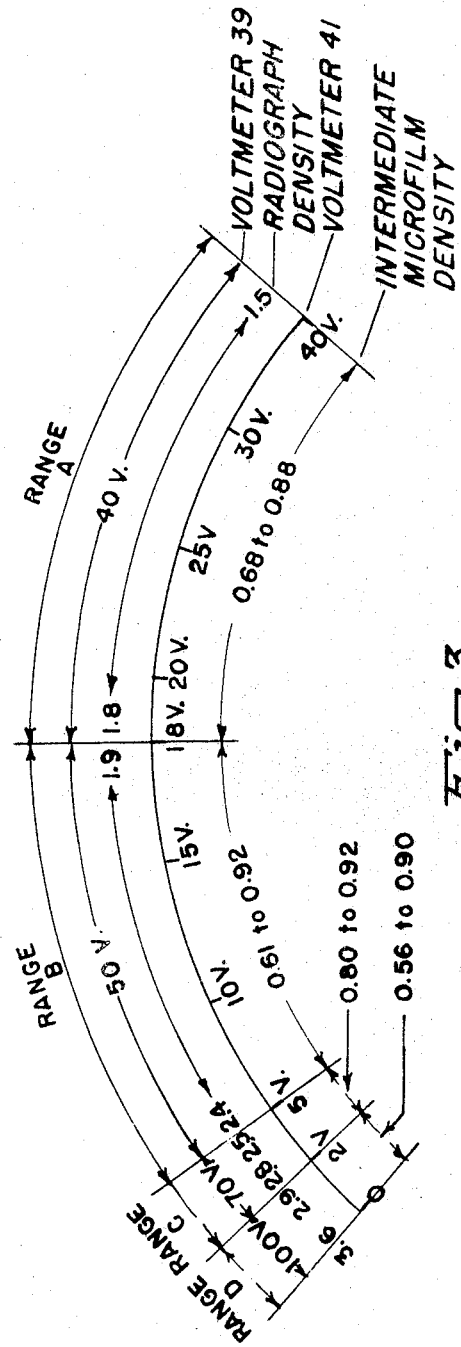
FIG. 3 is a graph illustrating the interrelationship between the constant light source, the variable light source, the density of the radiographic films and the density of the microfilm.

Referring now to FIGS. 3 and 4 is illustrated the interrelationship between voltmeter 39 and voltmeter 41 (which are directly related to the light outputs of light source 27 and light source 25, respectively) as a function of radiographic film densities and microfilm densities as a result of the indicated exposures. In order to more clearly understand the information set forth in these drawings it is important to note that the system of FIG. 1 is calibrated such that when there is 100% transmission from light source 25 to photodetector 13 and 100% transmission of light from variable light source 27 to camera 15, then the light output of light source 25 (in terms of lumens or its voltage equivalent) is equal to the light output of variable light source 27. The light from constant light source 25 that is passed through position (1) and received by photodetector 13 is measured in terms of the voltage output from photodetector 13 by means of voltmeter 41. The light from variable light source 27 is measured in terms of the voltage applied to variable light source 27. Therefore, when the light output from light source 25 is equal to the light output from variable light source 27, then voltmeters 39 and 41 will register the same voltages. FIG. 3 may also indicate the dial or face of voltmeter 41 as will be hereinafter discussed. It should be noted that the voltages indicated in FIGS. 3 and 4 represent the voltage to which voltmeter 39 must be set in order to provide the correct density of the microfilm when recording a given radiographic film within the density range of from 1.5 to 3.6. Also, in FIGS. 4A through 4D the symbols R/D indicate the density of the radiographic film, the symbols I/D represent the intermediate density of the film in camera 15 (the density of the negative of the film in camera 15), and the symbols P/D represent the density of the print film which is a positive film taken from the intermediate density film (I/D). A positive film is generally desirable since the positive density film (P/D) has the same image appearance as does the radiographic film. From FIGS. 4A through 4D it can be seen that the intermediate density (I/D) is within the optimum density range of about 0.6 to about 0.9 for each of Ranges A through D and the corresponding voltage outputs of voltmeter 39. As previously explained this is necessary in order to achieve optimum resolution of the microfilm which is exposed to ordinary light. From range A of FIGS. 2, 3 and 4A it can be seen that if voltmeter 39 is set at 40 volts, then radiographic films having densities (R/D) of 1.5 to 1.8 will result in microfilms that have optimum densities (I/D) of from 0.88 to 0.68. From Range B it can be seen that radiographs having a density (R/D) from 1.9 to 2.4 will result in intermediate microfilm densities (I/D) of from 0.92 to 0.61 when voltmeter 39 is operated at 50 volts. In like manner when voltmeter 39 is set at 70 volts then radiographic densities of from 2.5 to 2.8 will result in intermediate microfilm densities of 0.92 to 0.80 as indicated in Range C and for the 100 volt setting on voltmeter 39 radiographs having densities of 2.9 to 3.6 will fall within the desirable microfilm density range of from 0.90 to 0.56 as indicated in Range D.

Referring now to a typical operation, it can be seen that for radiographs having densities of from 1.5 to 1.8 that are located at the first position (1) of FIG. 1 the electrical output of photodetector 13 will be applied to the input of control device 35 that will cause arm 31 of variable resistor 29 to rotate to a position where voltmeter 39 will register 40 volts. When a radiographic film that is located in the first position (1) has a density within the range of 1.9 to 2.4, then the electrical output signal from photodetector 13 will cause control device 35 to position arm 31 so that the voltage on voltmeter 39 will be about 50 volts. Similarly, when the radiographic film in the first position (1) has a density of from 2.5 to 2.8, then voltmeter 39 will be about 70 volts and when the density is from 2.9 to 3.6 then the motor will be driven to a point where the voltage of voltmeter 39 is about 100 volts. The setting of voltmeter 39 by positioning arm 31 as a function of varying radiographic film densities as indicated by the electrical output of photodetector 13 is programmed by control device 35 of FIG. 1 to provide step increases of the voltage output applied to voltmeter 39 as indicated in FIGS. 2, 3 and 4. However, it may be desirable to provide a more gradual variation of the voltage of voltmeter 39 to more closely provided optimum density of the microfilm. For example, the most optimum microfilm intermediate density is about 0.85. Therefore, the voltage of voltmeter 39 may be more gradually changed for changes in radiographic film densities of from about 1.5 to about 3.1 so as to yield a highly optimum microfilm density range of from 0.86 to 0.84 as illustrated in Table A. It should be noted that there will be more deviation from this optimum density of 0.85 when the radiographic film density is from 3.2 to 3.5. However, this is still within the acceptable range and will include only a small percentage of the radiographic films taken under typical conditions.

TABLE A

| Radiograph density | Voltmeter 39 voltage | Intermediate density |
|---|---|---|
| 1.5 | 38 | 0.86 |
| 1.6 | 40 | 0.86 |
| 1.7 | 42 | 0.86 |
| 1.8 | 44 | 0.85 |
| 1.9 | 46 | 0.85 |
| 2.0 | 48 | 0.85 |
| 2.1 | 50 | 0.85 |
| 2.2 | 52 | 0.85 |
| 2.3 | 56 | 0.85 |
| 2.4 | 60 | 0.85 |
| 2.5 | 64 | 0.83 |
| 2.6 | 68 | 0.83 |
| 2.7 | 72 | 0.83 |
| 2.8 | 74 | 0.83 |
| 2.9 | 86 | 0.84 |
| 3.0 | 90 | 0.84 |
| 3.1 | 100 | 0.84 |
| 3.2 | 100 | 0.82 |
| 3.3 | 100 | 0.80 |
| 3.4 | 100 | 0.76 |
| 3.5 | 100 | 0.70 |

Figure 5:
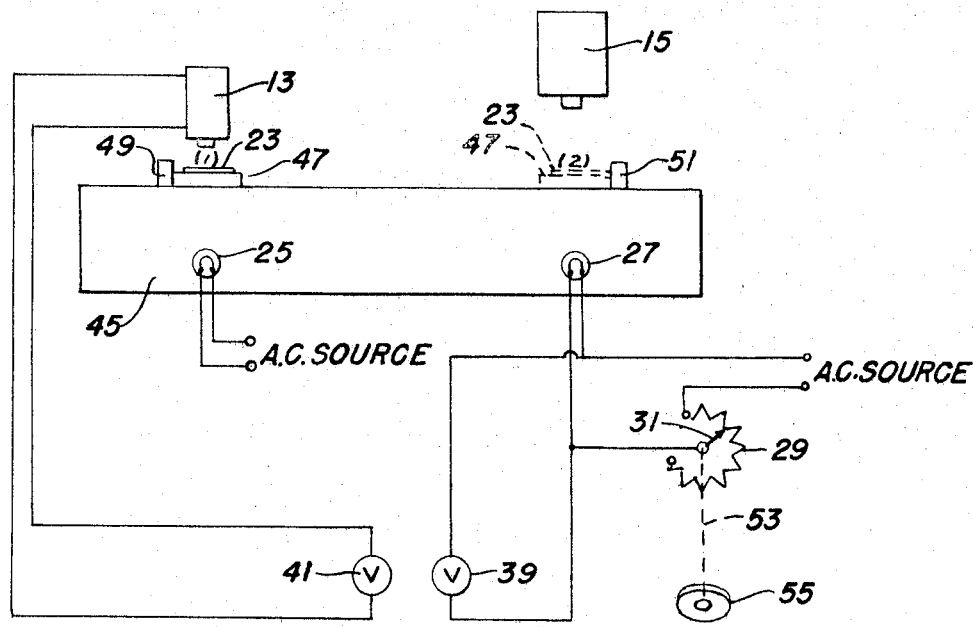
FIG. 5 is a schematic diagram of another embodiment of the microfilm system of the present invention.

Referring now to FIG. 5 is illustrated another embodiment of the present invention. This embodiment includes a table 45, a photodetector 13 and a microfilm camera 15. Mounted on table 45 is carriage 47 through which light can pass and upon which is mounted radiograph 23. Table 45 is provided with a track, not shown, upon which carriage 47 may slide from position (1) to position (2) and from position (2) to position (1). Stops 49 and 51 are provided to limit the movement of carriage 47 and to properly align it in the first and second positions. Mounted directly below photodetector 13 and radiograph 23 in the first position (1) is a constant output light source 25 which is connected to an AC source as indicated. Mounted directly below camera 15 and radiographic film 23 in the second position (2) is variable light source 27 which is connected to an AC power source through variable resistor 29. In this embodiment of the present invention rotatable arm 31 of variable resistor 29 is selectively positioned by manual rotation of shaft 53 and knob 55. When knob 55 is rotated clockwise more resistance is inserted in series with light source 27 and its light output is reduce and the voltage indication on voltmeter 39 is also reduced. Conversely, when knob 55 is rotated counterclockwise, less resistance is inserted in series and the light output of light source 77 is increased and the voltage indication on voltmeter 39 is also increased. Voltmeter 41 measures the voltage output of photodetector 13 which is a measure of the light transmitted through the radiographic film mounted on carriage 47 when in the first position (1). In FIG. 3 is indicated a dial which may be placed on the face of voltmeter 41 or the information of FIG. 3 may be used in conjunction with the readings of voltmeter 41 where voltmeter 41 reads a voltage output range of from 0 to 40 volts to correspond with the FIG. 3 voltage range of voltmeter 41 as described with relation to the FIG. 1 embodiment.

Operation of the FIG. 5 embodiment of the present invention is as follows. Radiographic film is placed in carriage 47 and constant light source 25 is actuated. The light from light source 25 is transmitted through carriage 47, (without attenuation) then through radiographic film 23

Figure 4A:
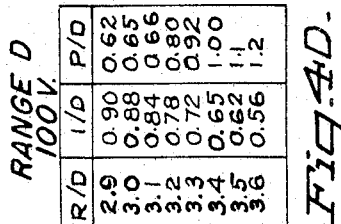
FIGS. 4A through 4D are charts illustrating the interrelationship at the radiographic density, and the optimum microfilm density range for varying conditions of operation.
Figure 4B:
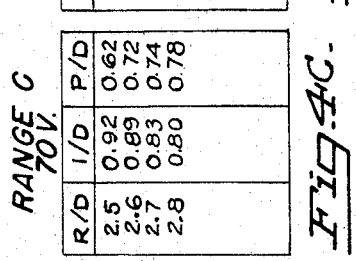
Figure 4C:
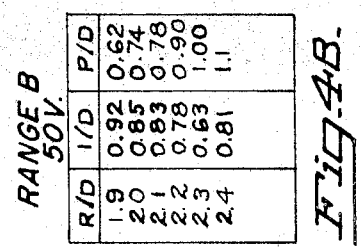
Figure 4D:
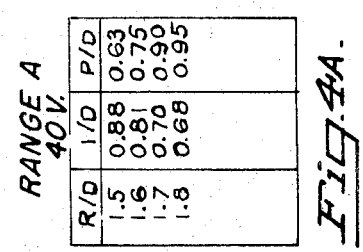

(where it is attenuated) and then to photodetector 13. The electrical output of photodetector 13 is proportional to the amount of light transmitted through radiographic film 23 which is a direct function of the density of the radiographic film. The electrical output from photodetector 13 is indicated by voltmeter 41 which is proportional to the density of the radiographic film. In accordance with the voltage reading of voltmeter 41, dial 55 is rotated until voltmeter 39 reads that voltage, in accordance with the value determined in FIG. 3, required to produce the optimum microfilm density (I/D). For example, if the voltage output from voltmeter 41 is 10 volts, in Range B of FIG. 3, then dial 55 is rotated until voltmeter 39 reads 50 volts as also indicated in Range B of FIG. 3. Then carriage 47 is moved from the first position (1) to the second position (2) and camera 15 is then operated to microfilm the radiographic film. Under this set of conditions the intermediate density (I/D) of the microfilm, when developed, will be in the optimum range of from 0.61 to 0.92 as indicated in FIG. 4B. The carriage is then returned to the first position (1) and the process repeated.

What is claimed is:
1. A device for converting radiographic film having a first predetermined density range to light responsive film having a second density range comprising:
 (a) a constant light output light source;
 (b) means for passing light from said constant output light source through a radiographic film having said first predetermined density range;
 (c) light responsive means for detecting the amount of light transmitted through said radiographic film having said first predetermined density range;
 (d) a variable light output light source;
 (e) means for passing light from said variable light output light source through said radiographic film having said first predetermined density range;
 (f) a control device operatively connected to said light responsive means for determining the amount of light output from said variable light output light source required to be passed through said radiographic film to light responsive film so that the light responsive film will be within said second predetermined density range when exposed to the light passing through the radiographic film receiving light from said variable light source;
 (g) control means for controlling the amount of light from said variable light source;
 (h) drive means for moving said radiographic film from a first position for receiving light from said constant light source to a second position for receiving light from said variable light source;
 (i) the output of said control device being operatively connected to said control means and to said drive means;
 (j) said drive means comprising a timer device and a drive motor;
 (k) said drive motor operatively connected to move said radiographic film from said first position to said second position; and
 (l) said timer device delaying the movement of said radiographic film from said first position to said second position until after the output signal from said control device has been received by said control means.

2. A device for converting radiographic film having a first predetermined density range to light responsive film having a second density range comprising:
 (a) a constant light output light source;
 (b) means for passing light from said constant output light source through a radiographic film having said first predetermined density range;
 (c) light responsive means for detecting the amount of light transmitted through said radiographic film having said first predetermined density range;
 (d) a variable light output light source;
 (e) means for passing light from said variable light output light source through said radiographic film having said first predetermined density range;
 (f) means responsive to said light responsive means for determining the amount of light output from said variable light output light source required to be passed through said radiographic film to light responsive film so that the light responsive film will be within said second predetermined density range when exposed to the light passing through the radiographic film receiving light from said variable light source;
 (g) said light responsive means comprising a photodetector and a first voltmeter;
 (h) said first voltmeter operatively connected to the output of said photodetector for determining the amount of light passing through said radiographic film from said constant output light source;
 (i) an interpreting means comprising a calibrated dial operatively connected to said voltmeter;
 (j) variable voltage means operatively connected to said variable light source for varying the light output of said variable light source;
 (k) a second voltmeter operatively connected to said variable voltage means and to said variable light source for indicating the light output from said variable light source; and
 (l) adjusting said variable voltage means so that said second voltmeter reads a voltage that is the same as that specified on said dial on said first voltmeter.

References Cited

UNITED STATES PATENTS

| | | | |
|---|---|---|---|
| 1,946,621 | 2/1934 | Hopkins | 355—83 |
| 1,999,556 | 4/1935 | Balsley | 355—83 |
| 2,580,779 | 1/1952 | Heyer et al. | 355—100 |
| 3,349,684 | 10/1967 | Lode | 355—68 X |
| 3,402,651 | 9/1968 | Pieronek et al. | 355—68 X |

FOREIGN PATENTS 1,460,895  10/1966  France.

NORTON ANSHER, Primary Examiner

R. L. MOSES, Assistant Examiner

U.S. Cl. X.R.
355—68, 83